Aug. 1, 1939.  H. H. OFFUTT  2,167,674

MANUFACTURE OF CARBON BLACK

Original Filed June 11, 1934

Inventor
Harold H. Offutt
by Kenway & Witter
Attorneys

Patented Aug. 1, 1939

2,167,674

UNITED STATES PATENT OFFICE 2,167,674

MANUFACTURE OF CARBON BLACK

Harold H. Offutt, Winchester, Mass., assignor to Godfrey L. Cabot, Inc., Boston, Mass., a corporation of Massachusetts Refiled for abandoned application Serial No. 730,059, June 11, 1934. This application August 10, 1937, Serial No. 158,355

5 Claims. (Cl. 134—60)

This invention relates to improvements in the manufacture of carbon black, and more particularly to a novel process of condensing or compacting into relatively dense granules flocculent carbon black such as is produced, for example, from natural gas by the impingement or channel process. The invention includes within its scope the novel product herein shown as produced by the process of my invention.

The present application is filed as a substitute of applicant's prior application Ser. No. 730,059, filed June 11, 1934.

Carbon black as first produced by combustion of natural gas is hardly more than a colloidal suspension of flocks or carbon particles in air. It has an apparent density in bulk of about 3 pounds per cubic foot and is light, flocculent, adherent and dusty. On this account, it is extremely difficult to pack, transport and handle in industry. The general object of the present invention is to provide a practical and economical process of converting carbon black of this character into a substantially dustless and relatively dense granular form in order to make it more convenient and economical in the respects noted and otherwise improve its characteristics for industrial uses.

I have found that the flocculent, colloidal suspension of carbon black particles in air may be converted to a much denser form if the air is replaced by water or other suitable liquid so as to form a suspension of carbon black in water, oil or other suitable liquid by displacement of the air under suitable conditions of operation.

I have also found that by overwetting a limited number of particles in a mass of carbon black groups of wetted particles may be caused to act as nuclei and that when a mass containing dry, flocculent carbon black and such wetted nuclei is stirred, the dry, flocculent black coheres to the nuclei by impact. The excess of water in the nuclei then seeps out into the cohering dry black and the forces of surface tension and the physico-chemical attractions of particle for particle come into play, resulting in the formation of stable agglomerates, sufficiently tenacious to withstand transportation in bulk, substantially dustless and having an apparent density in bulk of at least 12 pounds per cubic foot. Various wetting agents may be used, depending upon the character of the product desired. For example, granules of pure carbon black may be produced by wetting the nucleus particles with water, agitating the mass, and subsequently evaporating the water from the granular product. Again, carbon black granules useful in the manufacture of ink or lacquer may be produced by using oil as a wetting agent, and in this case it is not necessary to remove the oil from the granular product since this is a useful ingredient in inks.

The type of apparatus or equipment used in carrying out the process is of secondary importance so long as it provides means for stirring or agitating the carbon black mass and means for preventing caking which would result in the formation of shear surfaces. One satisfactory apparatus comprises a vertically-disposed cylindrical tank equipped with a rotary agitating cage, stationary baffle members, and a slow moving side and bottom scraper; another comprises a horizontally-disposed rotary drum with a wall and end scraper, each container being provided with a nozzle for spraying or otherwise supplying measured amounts of liquid to the mass of dry carbon black contained therein while it is being agitated.

I have found with the cheaper grades of carbon black, particularly those used by the rubber industry and those used for the purpose of making news inks, that the effect of the addition of water up to 1 part of water to 1½ parts carbon black is hardly noticeable, but that as it is added in an amount between 1 and 1½ parts of water to 1½ parts of carbon black a pronounced change takes place when the carbon black is agitated. This is characterized by a rapid decrease in volume and agglomeration of the flocculent carbon black into granules of varying sizes. As more water is added, these granules build up into solids of various sizes. This stage is definitely terminated when water amounting to more than 1½ parts of water to 1 part of carbon black has been added. Under these circumstances, the mixture begins to partake of the nature of a dough or paste and that condition marks the upper limit of the working range in which I am interested. The addition of water to an amount equal to the weight of the carbon black has the effect of reducing its volume substantially and of rendering more effective the mechanical work done in agitating the carbon black in course of treatment.

I have found that the sizes and shapes of granules depend to some extent upon the character of the stirring mechanism, upon the size of the drops of liquid and upon the rate at which they are admitted to the container. If the liquid is added rapidly to the carbon black in the container, spherical grains as large as peas may be formed and, while such a product is of good commercial density and much less dusty than the heavy compressed carbon black of commerce, it tends to break down into fragments of irregular shape and size when transported in bulk. Accordingly, it is preferred to supply the liquid slowly, as by dripping or atomizing, and thus to keep the granules always smaller in size, for example, below 40 mesh, in which size range they are stable in structure.

In making granules of pure carbon black, a preferable procedure is to atomize water in a fine mist upon the surface of flocculent carbon black which is being stirred. Under these conditions, an infinitely greater number of wetted nuclei is formed and, consequently, a greater number of granules is produced. Granules produced by this procedure, when dried, are suitable for immediate shipment in bulk without danger of any considerable amount of disintegration. The product thus produced may have an apparent density in bulk of upwards of 15 pounds per cubic foot. If the agitating process is prolonged and a greater amount of work done upon the carbon black, the granules tend to become reduced in size and increased in density. Similar results may be secured by returning the dried granules to the agitating apparatus and continuing the agitating process. Under such conditions, it is possible to raise the apparent density of the product as high as 30 or 35 pounds per cubic foot.

When carbon black is to be used for the manufacture of ink, it is important that it shall be free from aggregates which offer resistance to dispersion.

The usual procedure in the carbon black industry for preparing carbon for shipment to ink manufacturers has been to increase the apparent density of the carbon black from 3 pounds per cubic foot to 12 pounds per cubic foot by dry agitation. Occasionally dry adhesions that are indispersable under normal ink manufacturing conditions are formed in the product. The ink manufacturer knows these agglomerates as grit and considers them highly objectionable.

I have found that flocculent carbon black may be readily condensed to an apparent density of 12 pounds or more per cubic foot by wetting the mass of carbon black in thin layers with oil accompanied by no more stirring than is necessary to present new surfaces for wetting. The process may best be carried out in a horizontally disposed rotating drum with side and end scraper provided with a nozzle for spraying measured amounts of oil on the fluffy freshly exposed surface of the carbon black.

Under these conditions, I have found that 2 parts of oil are required to 1 part of carbon black in order to produce a dustless, free-flowing, oil-black mixture of good commercial density for use in the manufacture of news ink of which mineral oil is a usual constituent. Mixtures of oil and black prepared in this manner possess the new and novel feature of containing none of the grit with which the ink manufacturer has had formerly to contend. As evidence of this, I have found that an ink made from the ordinary agitated, news-ink carbon black will show a residue of .1% on a 300-mesh screen, whereas an ink made from identical raw material by my new process will show a residue of .01% only.

As evidence of the absence of agglomerates of of a size smaller than 300-mesh, I have found that an ink made from the ordinary agitated, news-ink carbon black will flow 12 inches under a standard procedure for flow test, whereas an ink made from my new product and containing the same percentage of carbon black will only flow ¼ of an inch. Stated otherwise, these figures prove a great superiority in fineness of dispersion for the new product.

I have found that oil black mixtures of good commercial density and dustless, free-flowing characteristics may be produced in a vertically-disposed cylindrical tank equipped with a rotary agitating cage, stationary baffle members, and a slow moving side and bottom scraper, using 1 part of oil to 1 part of carbon black.

Under these conditions, the stirring is much more efficient than in the example previously given. Consequently, the number of chance dry adhesions is greater and ink made from this product is not quite as satisfactory, although it is better than ink made from the ordinary agitated, news-ink carbon black.

In order to prevent objectionable dry adhesions and indispersible aggregates, it is advisable that no more stirring be done than is necessary to expose fresh surfaces and that the oil film be depended upon almost entirely for the condensation of the carbon black.

The product obtained by either of the above-mentioned procedures consists of somewhat irregularly shaped spheroidal granules of carbon black and oil bonded together by the surface tension effects of the oil film and by the inherent physico-chemical attraction of carbon black particle for carbon black particle. However, under the described conditions, the oil film tends to prevent dry adhesions that are difficult or impossible to break down during the ink manufacturing process. Here, as before, the size and shape of the granules depends upon the fineness of the drop of oil sprayed upon the carbon black and the amount of work done upon the mixture.

These and other features of the invention will be best understood and appreciated from the following description of a specific example, of its application, illustrated in the accompanying drawing, in which—

Figure 1:
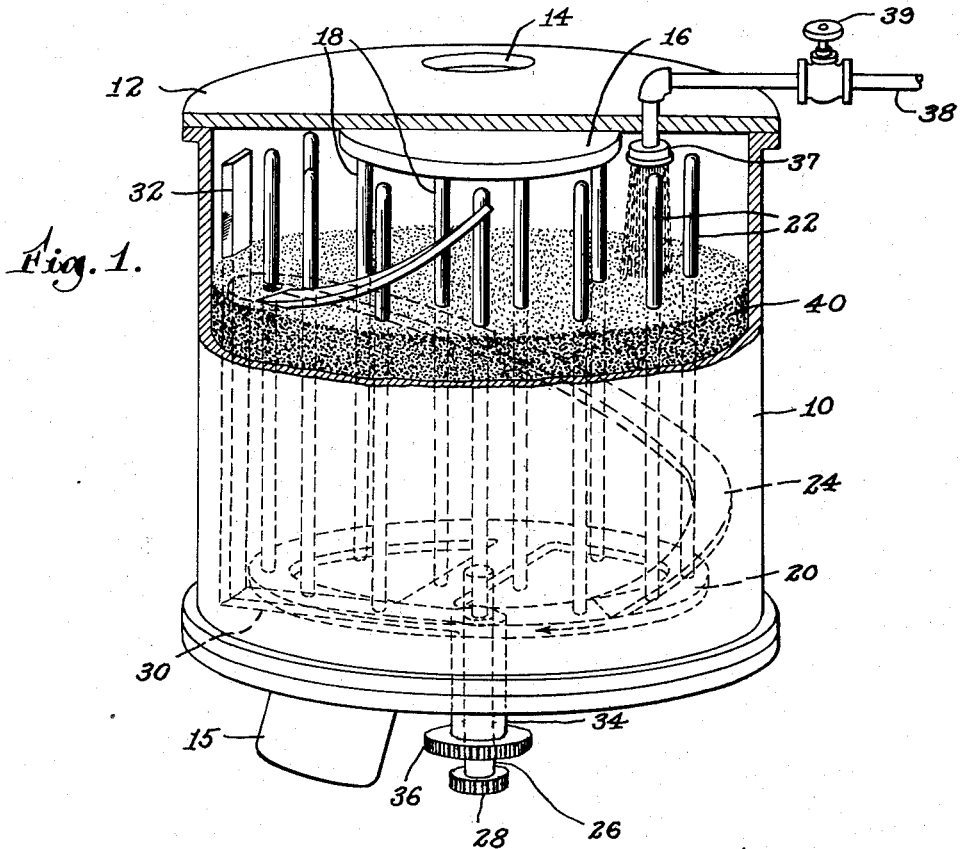
Fig. 1 is a view in perspective showing on suitable form of apparatus, with portions broken away to show the mass of carbon black therein.

The apparatus illustrated comprises a vertically-disposed cylinder or drum 10 having a removable cover 12 provided with a hand hole 14 and a discharge chute 15 in its bottom. Secured to the inner face of the cover 12 is a disk 16 from which project downwardly a series of stationary baffle rods 18 arranged substantially concentrically in the drum. A disk 20 is mounted for rotation near the bottom of the drum and provided with a series of upwardly-projecting baffle rods 22 arranged concentrically in a circle outside the stationary baffle rods 18. The rotatable disk 20 also carries a flat spiral band 24 which extends to a point adjacent the upper ends of the baffle rods 22. The disk 20 is secured to and driven by a shaft 26 which is mounted in suitable bearings beneath the bottom of the drum and provided at its lower end with a pinion 28 by which it may be rotated through any suitable gear train. Beneath the disk 20 is located a bottom scraper 30, and from the outer end of this extends an upright side scraper 32. The bottom scraper 30 is secured to and driven by a sleeve 34 mounted in suitable bearings concentrically with respect to the shaft 26 and provided with a driving gear wheel 36 by which the scrapers may be driven independently of and at a slower rate than the cage formed by the disk 20 and the baffle rods 22. In the upper part of the drum is provided an atomizing nozzle 37 supplied by a pipe 38 and controlled by a valve 39.

One example of the manner in which the above described apparatus may be used in carrying out the novel process of my invention is as follows. The drum is supplied with a charge of 100 pounds of carbon black of any of the cheaper grades used in the manufacture of rubber or ink and having an apparent density in bulk of about 3 pounds per cubic foot. The mass of carbon black in the drum is indicated by reference character 40. The valve 39 is then adjusted to supply water at the rate of about 100 pounds in 30 minutes, and power is applied to rotate the scrapers at a rate of about 2 revolutions per minute and the disk 20 with its baffle rods 22 at the rate of about 40 revolutions per minute. As already explained, the water supplied by the nozzle 37 in the form of a mist or very fine spray is effective to overwet isolated groups of carbon black particles upon the surface of the carbon black mass. These wetted groups of particles act as nuclei upon which are built up stable agglomerates of generally spheriodal form as the whole carbon black mass is agitated by the movement through it of the baffle rods 22 and the spiral member 24. The stationary baffle rods 18 prevent movement of the carbon black mass as a whole and cause a general agitation and flowing of the particles upon each other so that the wetted nuclei are moved in the mass, brought into contact with dry particles, and turned so that they tend to build up systematically and progressively and form homogeneous bodies held together by the coherent force of particle for particle, surface tension of the water and other surface effects which are not fully understood. The action of the scrapers is to prevent caking of the carbon black upon the bottom and side walls of the drum.

As the process proceeds, there is no apparent change in the mass of carbon black being treated until about 66 pounds of water has been supplied by the nozzle 37. From the point on and until about 100 pounds of water has been supplied, there is a very pronounced concentration and contraction of the carbon black mass and the gradual and increasing appearance therein of spheroidal grains of carbon black, as distinguished from the flocculent particles present at the beginning of the procedure.

At the end of about 30 minutes, when 100 pounds of water has been supplied through one or more atomizing nozzles as above outlined, the charge may be drawn off and dried, and it will be found that the flocculent carbon black has entirely disappeared, having been converted into granules more or less spheroidal in shape, between 100-mesh and 20-mesh in size and having an apparent density in bulk of about 15 pounds per cubic foot. This product is substantially dustless, free flowing and sufficiently tenacious of structure to withstand shipment in bulk without dusty disintegration. A small grain size is generally to be preferred for shipping and if, instead of drawing off the charge as soon as converted, the process is continued for another 30 minutes, the granules become reduced in size and increased in density to 20 pounds per cubic foot or more. In general, I have found that between 40-mesh and 60-mesh is the optimum size of granule for shipping. The converted granular charge may be conveniently dried in about 3 hours at a temperature of 100° C. if spread in a layer about one-half inch thick.

Figure 2:
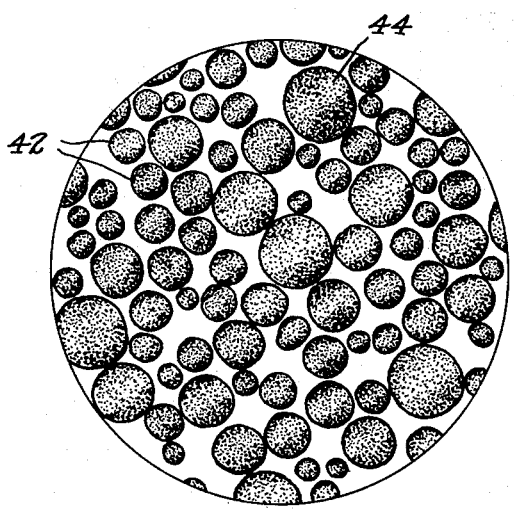
Fig. 2 represents spherical grains of carbon black granules as shown in the field of a microscope magnified about 60 diameters.
Figure 3:
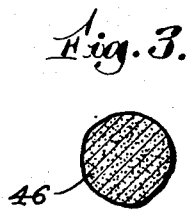
Fig. 3 is a sectional view of a single spherical granule magnified 300 diameters.

In Fig. 2 I have shown the general appearance of the carbon black granules as they appear in the field of a microscope, magnified about 60 diameters, at the conclusion of the process of treatment above described. In Fig. 3 is represented a single granule in cross section, and from this it will be observed that the structure of the entire granule is homogeneous, without concentric shells or irregular agglomerates of various densities. The resulting granules are, of course, when dried of pure carbon black without the addition of any binding material and while they are individually tenacious enough to withstand transportation in bulk they may be easily broken down and dispersed, for example in a rubber mix, by slight shearing or rubbing pressure.

In preparing an oil-carbon black mixture, the same apparatus may be used and oil may be supplied in the form of a fine mist by the nozzle 37. The process proceeds as above except that the amount of agitation is reduced to the minimum and the final density of the product is somewhat less.

The apparatus herein shown is disclosed in United States Letters Patent No. 2,121,535 granted June 21, 1938, on an application of F. H. Amon, to which reference may be had for further details of construction. It will be understood, however, that such apparatus is illustrative only and that many variations in treatment are within the scope of the invention. For example, the oil or liquid may be delivered within the mass of flocculent carbon black and the latter may if desired, be agitated by fluid rather than mechanical means.

Having thus described my invention, what I claim as new and desire to secure by Letters Patent is:

1. The method of compacting flocculent carbon black, which consists in spraying oil upon the surface of a mass thereof, continuing the spraying step until a weight of oil has been added not less than 66% nor more than 200% of the weight of the dry carbon black treated, and simultaneously slowly stirring the mass to expose fresh surfaces to the oil spray, thereby producing directly from the treated mass relatively dense, completely dispersible granular aggregates capable of being transported in bulk without dusty disintegration.

2. The process of preparing a granular oil-carbon black mixture from flocculent carbon black, which consists in spraying not less than one part nor more than two parts of oil upon one part of flocculent carbon black, and agitating the mass and thereby producing directly from the treated mass a dustless oil-black mixture of granules bonded internally by the inherent cohesiveness of the carbon black particles and the surface tension of the oil film and which is substantially free of dry adhesions in the carbon black.

3. A composition of matter for use in the manufacture of news ink and comprising tenacious granules formed to withstand disintegration during transit having a composition of oil to the amount of from $33\frac{1}{3}\%$ to $66\frac{2}{3}\%$, and carbon black to the amount of from $66\frac{2}{3}\%$ to $33\frac{1}{3}\%$.

4. A new product of manufacture for use in the production of news ink, carbon black-oil mixtures in the form of granules of relatively tenacious, physically homogeneous internal structure, having a composition of about two parts oil to one part carbon black and being substantially free from dry indispersible carbon black aggregates.

5. As a new product of manufacture, a dustless mass of granular carbon black and oil, the granules being sufficiently tenacious to withstand transportation in bulk, having an apparent density of at least twelve pounds per cubic foot and substantially free from indispersible carbon black aggregates, and having a composition of about two parts oil to one part carbon black.

HAROLD H. OFFUTT.